(12) United States Patent
Wehrle

(10) Patent No.: US 6,305,693 B1
(45) Date of Patent: Oct. 23, 2001

(54) PRECISION LOAD ADJUSTABLE ROTARY SHAFT SEAL

(75) Inventor: Paul Francis Wehrle, Wiscasset, ME (US)

(73) Assignee: Woodex Bearing Company, Inc., Georgetown, ME (US)

( * ) Notice: Subject to any disclaimer, the term of this patent is extended or adjusted under 35 U.S.C. 154(b) by 0 days.

(21) Appl. No.: 09/544,371

(22) Filed: Apr. 6, 2000

(51) Int. Cl.$^7$ ...................................................... F16J 15/34
(52) U.S. Cl. .......................... 277/377; 277/379; 277/370; 277/373
(58) Field of Search ...................... 277/377, 379, 277/370, 373, 385, 522, 523

(56) References Cited

U.S. PATENT DOCUMENTS

| 2,374,353 | * | 4/1945 | Jacobson | 277/377 |
| 2,571,035 | * | 10/1951 | Hastings | 277/377 |
| 5,188,377 | * | 2/1993 | Drumm | 277/379 |
| 5,275,421 | * | 1/1994 | Hornsy | 277/373 |
| 5,863,047 | * | 11/1999 | Ellis | 277/377 |
| 6,017,036 | * | 11/2000 | Murphy | 277/377 |

* cited by examiner

Primary Examiner—Chuck Y. Mah
Assistant Examiner—Enoch E Peavey
(74) Attorney, Agent, or Firm—Barry G. Magidoff; Paul J. Sutton

(57) ABSTRACT

A rotary seal assembly is comprised of a collar adapted to be fixedly mounted on a shaft, the collar including a plurality of through going apertures parallel to the axis of the shaft. Drive fingers are slideably mounted within the bores of the collar, an inner end of the fingers being fixed to a pusher ring shiftable toward and away from the collar. The outer end of the fingers extend through complemental apertures formed in a containment ring into a rotary seal component. Springs are biased between the containment ring and drive collar to urge the fingers axially into aligned bores formed in a rotary seal member. Characterizing features of the invention reside in the rotary seal member being endwisely removable from the fingers and by the ability to factory preset the precise force with which the rotary seal component will be urged against the static seal face by adjusting the position of the collar relative to the static seal face and inserting tabs between the collar and containment ring of a size to maintain the adjusted position of the parts.

3 Claims, 3 Drawing Sheets

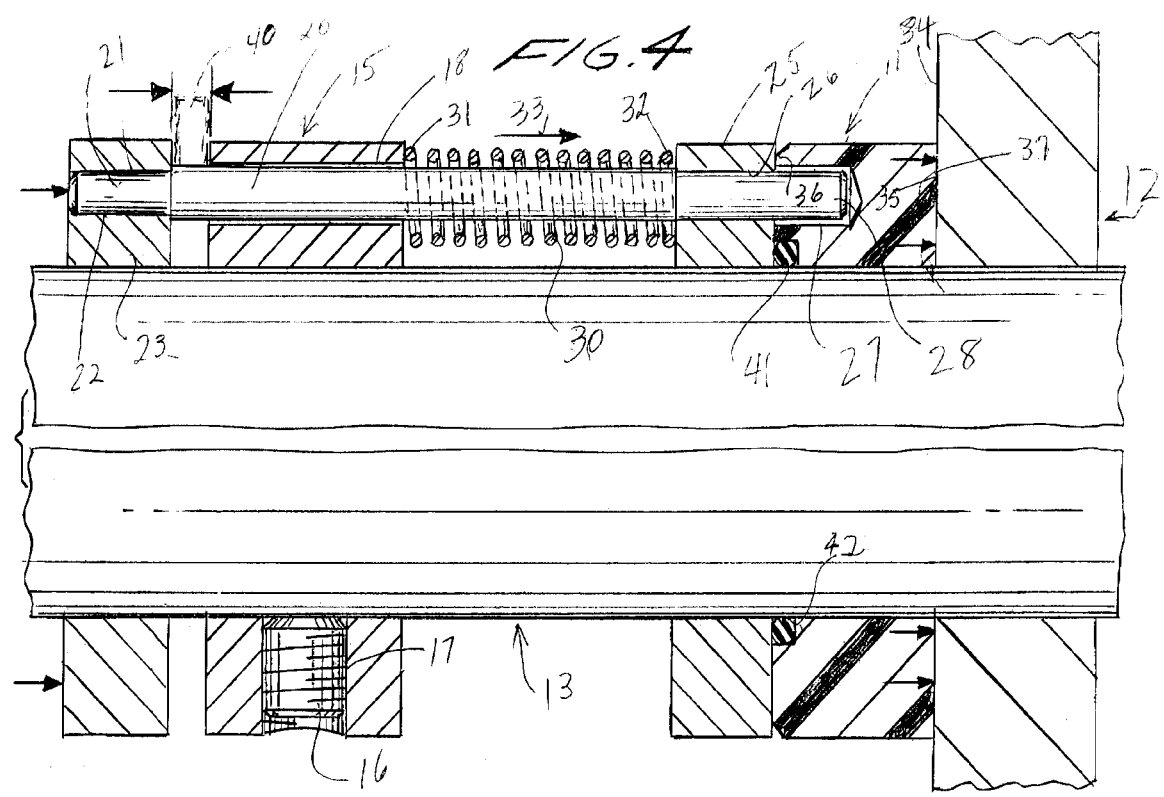

PRECISION LOAD ADJUSTABLE ROTARY SHAFT SEAL

BACKGROUND OF THE INVENTION

1. Field of the Invention

The present invention is directed to a rotary shaft seal and more particularly to a shaft seal suitable for high speed operations. The invention is further directed to a rotary seal of the type described wherein the face pressure with which the moving part contacts the stationery seal face may be set with precision. The invention is further directed to a seal assembly characterized in that it may be readily mounted and de-mounted from the drive shaft and wherein the substitute sacrificial moving part may be readily installed without the necessity of returning the seal assembly to the factory.

2. Description of the Prior Art

The use of rotary seals has, by and large, replaced the use of stuffing box seals. In a conventional rotary seal, a rotating member is pressed against a static surface whereby fluids are precluded from passing through the interface between the static and rotating components of the seal.

Rotary seals are capable of accommodating a significant degree of shaft eccentricity, a capability not found in stuffing boxes.

In high-speed applications, it is desirable that the rotary component of the seal engage the static component with a precisely determined force. In order to provide a long working life, since wear is significant in seals of this sort, it is conventional to employ as a rotary component wear-resistant substances such as carbides, sintered carbon, etc. A deficiency of such substances is their susceptibility to chipping or cracking unless handled with extreme care. In view of the fragility of such substances, a significant amount of damage occurs in the course of shipping and handling the fully assembled seal.

Conventional seals of the type described typically comprise a mounting collar adapted to be coupled to the shaft and a seal-face carrier member. The seal-face carrier is shiftable axially relative to the drive collar. Drive fingers extend from the collar to the seal-face carrier to provide a rotary driving connection between the two components. The respective components are biased apart by a plurality of coil springs, the respective ends of which are mounted in aligned apertures in the collar and seal-face carrier.

As will be apparent from the foregoing, when the seal-face is worn to the point that an unacceptably low sealing force is exerted, it is necessary to separate the seal-face from the collar and substitute a new seal carrier member. This substitution involves aligning the ends of each of the springs (often 20 or more) with a pair of the opposed apertures in the seal-face and the mounting collar. The complexity of effecting this re-mounting usually requires the return of the entire assembly to the factory.

PRIOR ART

The most closely related prior art is considered to be a seal manufactured by the A.W. Chesterton Company of Stoneham, Mass. and is identified by that company as the 880 seal. This seal employs a structure as generally described above including sixteen coil springs interposed between the drive collar and the seal carrier rings. A drive connection between the mounting collar and the seal carrier is provided by fingers on the carrier extending into slots on the collar.

Also relevant are rotary seal structures assigned to or licensed to the assignee of the instant application, namely U.S. Pat. No. 5,409,241 disclosing a double seal-faced arrangement wherein seal-face pressure is generated by axial expansion of an elastomeric ring, U.S. Pat. Nos. 3,988,026; 4,217,980; 4,365,707; 4,809,992 and 4,822,056 all of which refer to rotary shaft seals utilizing elastomeric expansion to generate seal face force.

SUMMARY OF THE INVENTION

The present invention may be summarized as directed to a simple and readily installed and refurbished rotary seal assembly. More particularly the invention is directed to a single-face seal assembly wherein the rotary seal face is urged against the stationery seal face by a plurality of coil springs aligned with the shaft axis, the springs being radially spaced about the shaft. The springs are mounted over drive fingers which extend axially and are slideably mounted within complemental apertures formed in the drive collar. The outer ends of the drive pins are slideably received in complemental apertures formed in the portion of the rotating seal face remote from the stationery seal. The inner ends of the drive fingers are fixed to an annular ring spaced inwardly from the collar.

The described structure includes numerous advantageous not found in known seal structures. Specifically, in order to achieve a precise seal face pressure it is possible, at the factory, to compress the springs to a precisely desired amount and interpose a removable clip or tab between the collar and the annular ring spaced inwardly from the collar. The spring force will retain the clips or tabs in position until after installation is effected, following which removal the of the tabs will result in application of the desired quantum of pressure.

A further and important advantage of the described seal resides in the fact that the drive fingers extend slideably into complemental apertures formed in the rotating seal member, the rotating seal being endwisely removable and replaceable without the necessity of aligning springs. This is so since the springs are captured between the drive collar and a pusher ring through which the pins pass.

It is accordingly an object of the invention to provide a rotary seal which may be factory set to exert a predetermined pressure following mounting. A further object of the invention is the provision of a seal of the type described wherein the rotary seal component may be endwisely removed from the remaining components of the seal. The facile endwise removability and replaceability of the rotary seal component enables the rotary seal to be separately packaged for shipment, reducing the susceptibility of damage to the fragile seal face component. A further object of the invention is the provision of a device of the type described wherein a new rotary seal component may be readily applied without the use of jigs or like-assembly devices since the rotary component may be simply axially slipped over the projecting ends of the drive fingers. In the device of the invention, the drive fingers serve the multiple purposes of providing a driving connection between the shaft and the rotary seal component and as a mounting guide for the springs.

BRIEF DESCRIPTION OF THE DRAWINGS

FIG. 4 is magnified vertical sectional view showing the position of the various components after removal of the adjustment tabs.

DETAILED DESCRIPTION OF THE DRAWINGS

Figure 1:
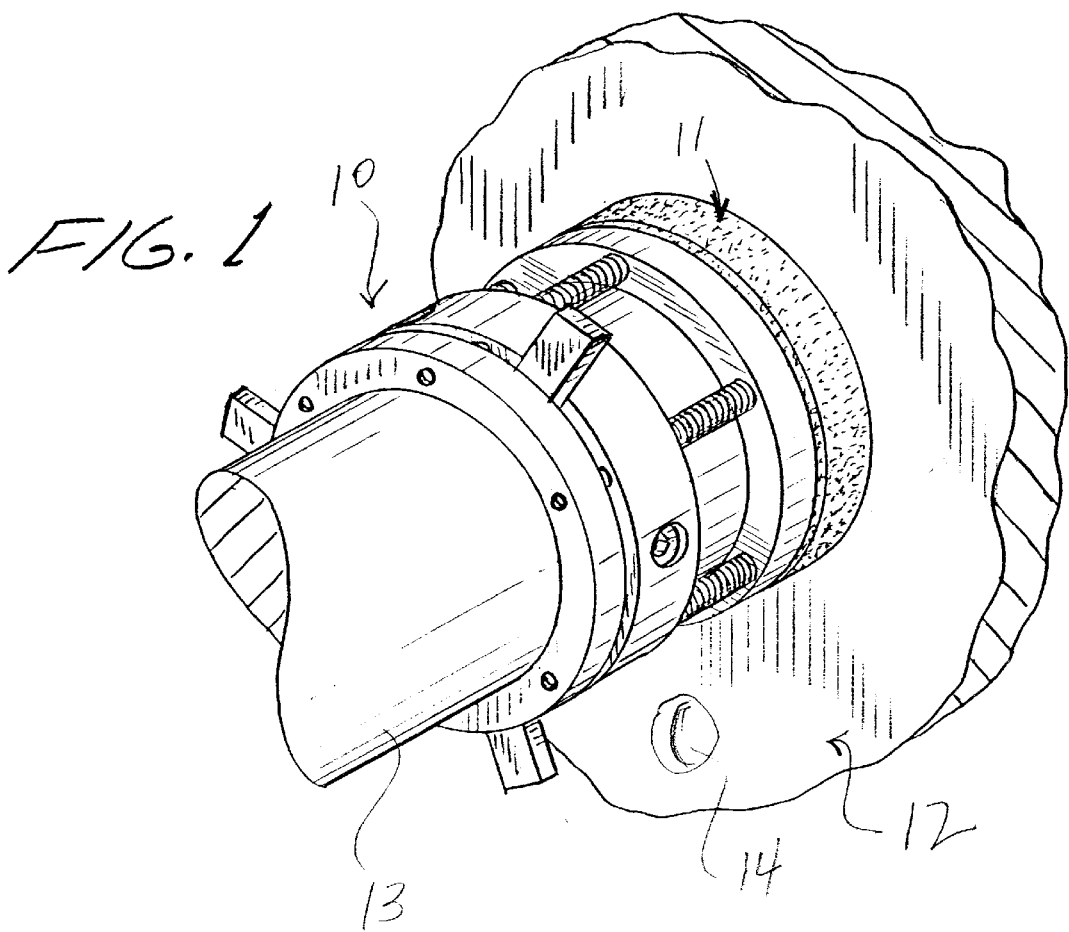
FIG. 1 is a perspective view of a seal assembly in accordance with the invention mounted on a drive shaft.

There is disclosed a rotary seal device 10 which includes a rotating seal member or component 11 and a static or fixed seal component 12. The assembly is mounted on a drive shaft 13 which passes through the static seal 12. The static seal 12 is mounted as by mounting bolts passing through mounting apertures 14 in the static seal, thereby securing the seal 12 to the bulkhead or mounting wall (not shown) through which the shaft 13 passes.

Referring now to FIG. 4, the seal assembly 10 includes annular drive collar 15, the collar being clamped to the shaft 13 by one or more grub screws 16 threaded into radially directed apertures 17 in the drive collar 15.

The drive collar 15 includes axially extending, through-going bores 18 the bores 18 being radially spaced apart about the collar 15 (in the illustrated embodiment, six such bores spaced apart by 60° are provided).

Slideably disposed within each bore 18 is a drive pin 20. The inner ends 21 of drive pins 20 are fixedly mounted in apertures 22 formed in a pusher or containment ring 23. The apertures 22 are aligned with the bores 18 of the collar 15. An annular guide or pusher ring 25 is axially slideably mounted on shaft 13, the guide ring including axially directed apertures 26. Drive fingers 20 extend through apertures 26 the fingers being fixedly related to the pusher ring 25, i.e., the fingers are not slidable within the apertures 26.

The rotary seal member 11 includes a series of blind bores 27 spaced to receive the free ends 28 of the drive pins 20. The blind bores 27 are substantially oversized relative to the pin diameter, whereby the seal assembly 11 may be axially removed from the remainder of the structure.

A coil spring 30 is mounted on each of the fingers 20, the ends 31, 32 of the spring being biased against drive collar 15 and guide ring 25 respectively. As will be apparent, compressed springs 30 will urge guide ring 25 axially in the direction of arrows 33 toward the surface 34 of static seal 12. The guide ring 25 in turn engages against the trailing end 36 of rotary seal 11 whereby the seal surface 37 of the rotary seal is engaged against static seal surface 34 with a force which is a function of the adjusted position of collar 15 along the shaft 13. More particularly, the closer the collar 15 is moved toward the static seal surface, the greater the force with which the rotary seal 11 will be pressed against the static seal.

Figure 2:
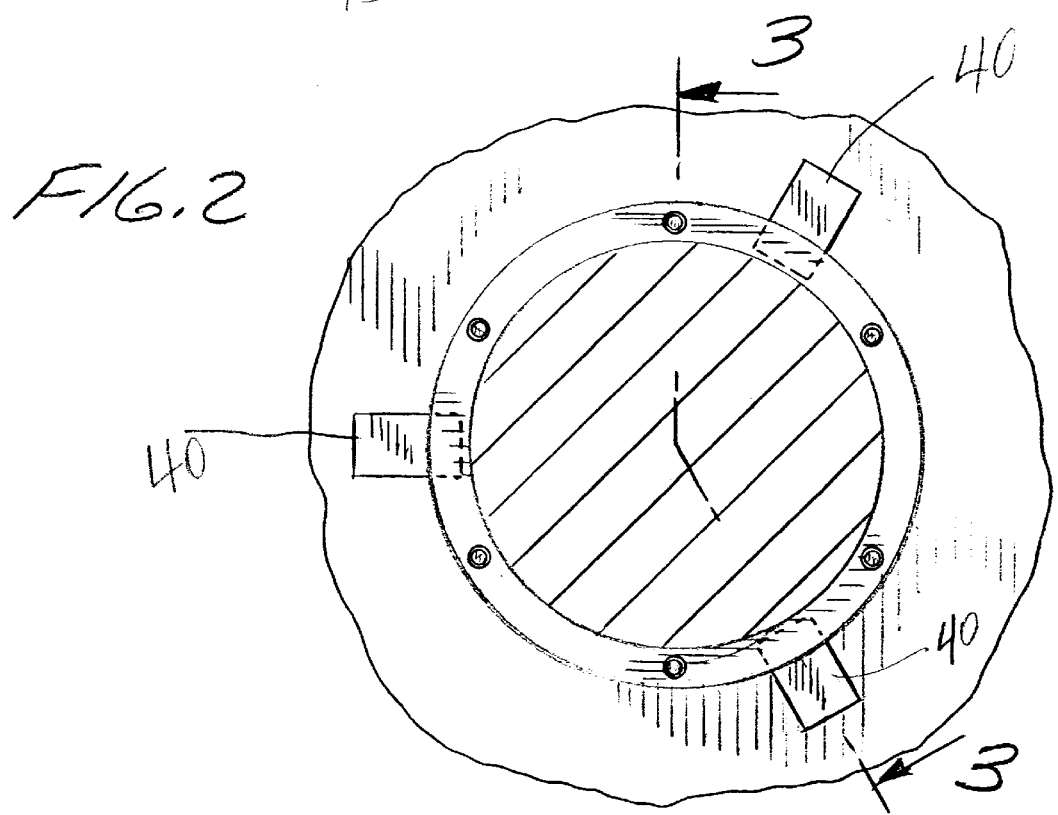
FIG. 2 is an end elevational view of the seal prior to removal of the force adjustment tabs.
Figure 3:
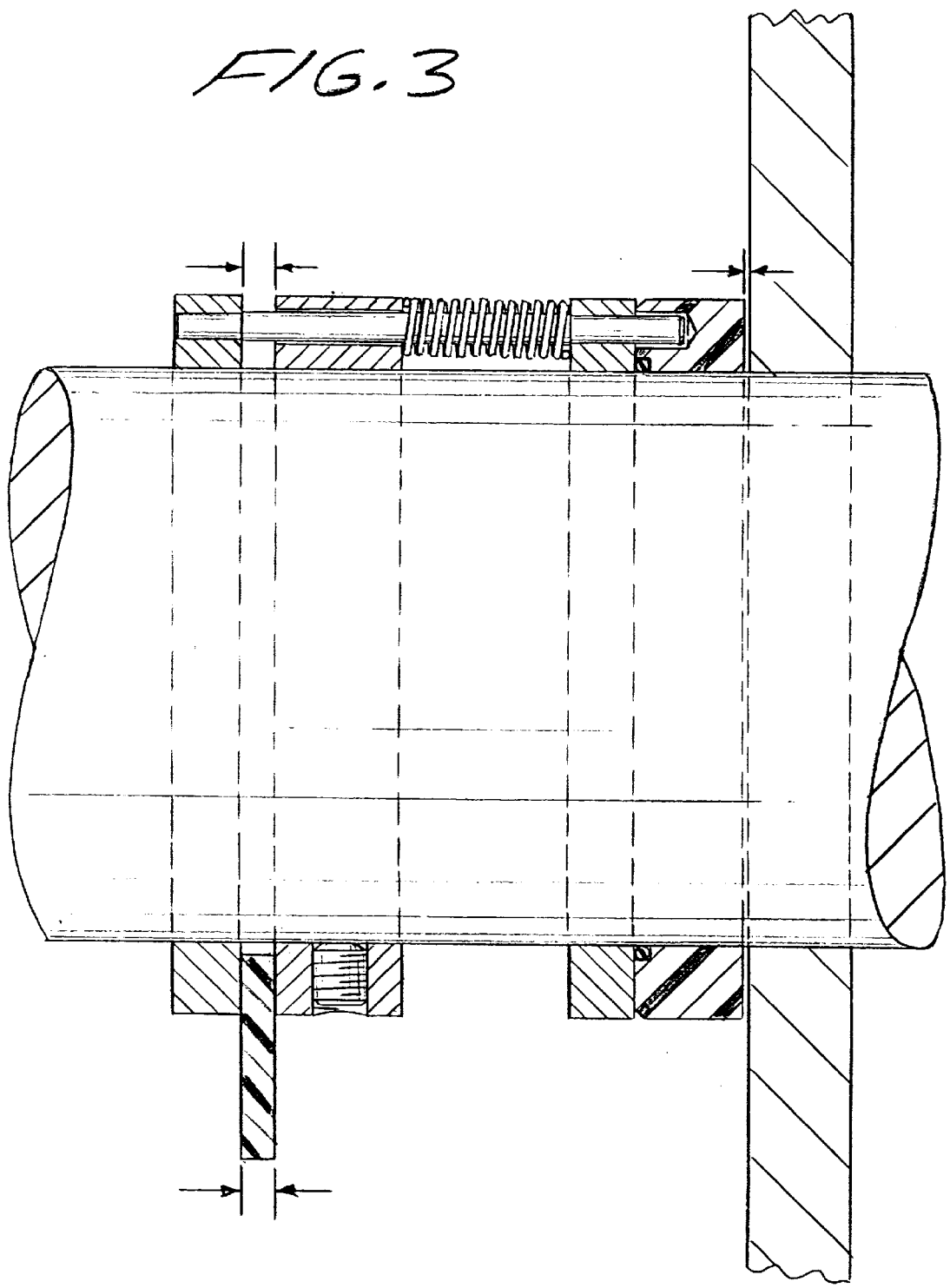
FIG. 3 is a section taken on the discontinuous lines 3—3 of FIG. 2.

As shown in FIGS. 1 and 2 and in dotted lines FIG. 4, there are provided removable tabs 40 interposed between pusher ring 23 and drive collar 15. Tabs 40 are maintained in position until installation by the compressive forces of the springs 30 which urge the pusher ring toward the drive collar. It is thus possible for the face pressure of the rotary seal 11 against the static seal 12 to be factory adjusted to a precisely desired amount. To mount the seal assembly on shaft 13 the collar 15 is shifted toward seal surface 34 to shift the surface 37 of the rotary component 11 against surface 34. The collar is then locked to the shaft by grub screws 16 and the tabs 40 removed. It will be appreciated that upon removal of the tabs between the static and rotary seal faces the force with which the expanding springs 30 urge the rotary seal is pressed against the static seal surface will be in accordance with the factory setting. The factory setting is accomplished by moving the seal 11 outwardly via pressure exerted on collar 15 and inserting tabs 40 of an appropriate width to fill the space between collar 15 and guide ring 23 when the desired compressive force is achieved.

As is conventional, an O ring 41 is mounted within a recess 42 within the rotary seal 11 to prevent fluids from passing axially along the length of the shaft.

As will be apparent from the preceding disclosures, there is provided in accordance with the invention a simple rotary seal assembly which may be factory set to exhibit a precise compressive force between the rotary seal face and the surface of the static seal. An important advantage of the invention resides in the ability to replace the sacrificial seal element 11 by a simple axial removal of the component 11. In contrast to the prior art seals, replacement of worn rotary seal components does not mandate disassembly of the components of the seal. In addition, the play or clearances with which the free ends of the drive fingers enter the drive apertures of the rotary seals enables a significant amount of relative movement between fingers and seal whereby eccentricities of the shaft or small deviations from perpendicular of the shaft relative to the static seal may be accommodated while the surface of the rotating component is nonetheless maintained in perfect contact with the static seal face.

As will be apparent to those skilled in the art and familiarized with the instant disclosure, numerous variations in details of construction may be made without departing from the spirit of the invention. For example, the rotary seal element may be a single component or a two part structure wherein the seal may be captured within an annular support component. Accordingly, the invention is to be broadly construed within the scope of the appended claims.

While there have been shown and described and pointed out the fundamental novel features of the invention as applied to the preferred embodiments, as are presently contemplated for carrying them out, it will be understood that various omissions and substitutions and changes of the form and details of the devices illustrated and in their operation may be made by those skilled in the art, without departing from the spirit of the invention.

What is claimed is:

1. A precision, load-adjustable rotary shaft seal assembly comprising a stationery seal surface, an annular drive collar adapted to be mounted on a shaft extending through said stationary seal surface, lock means on said collar for axially adjustably coupling said collar to said shaft, a plurality of guide bores in said collar equidistant from and aligned with the axis of said shaft, a drive finger slideably mounted in each said bore, said fingers including first and second end portions extending beyond respective opposite sides of said collar, a containment ring in proximate spaced relation to the side of said collar remote from said seal surface, said first end portions of said fingers being fixed to said containment ring, a pusher ring interposed between said collar and said stationary seal surface said second end portions extending through and fixed to said pusher ring, an annular rotary seal member interposed between said stationary seal surface and said pusher ring, said rotary seal member including a plurality of drive apertures parallel to the axis of said shaft, said second end portions of said fingers each being axially slideably received in a respective said drive aperture, and a coil spring surrounding each said finger said springs being biased between said collar and said pusher ring and urging said pusher ring and said rotary seal toward said stationary surface, said rotary seal being endwisely removable from said fingers.

2. A shaft seal assembly in accordance with claim 1 wherein the biasing force applied to said pusher ring is adjustable response to the axially adjusted position of said collar relative to said shaft.

3. A shaft seal assembly in accordance with claim 2 and including spacer means interposed between said containment ring and said drive collar said spacer means being releaseably retained between said ring and collar by the biasing force of said springs.

* * * * *